United States Patent [19]
Feldmann et al.

[11] 4,143,025
[45] Mar. 6, 1979

[54] METHOD FOR PRODUCING POLYLAUROLACTAM POWDER COMPOSITIONS FOR THE COATING OF METALS AT HIGH TEMPERATURES

[75] Inventors: Rainer Feldmann, Marl; Hans-Joachim Panoch; Heinz Scholten, both of Haltern; Roland Feinauer, Marl, all of Fed. Rep. of Germany

[73] Assignee: Chemische Werke Hüls AG, Marl, Fed. Rep. of Germany

[21] Appl. No.: 722,110

[22] Filed: Sep. 10, 1976

[30] Foreign Application Priority Data

Oct. 9, 1975 [DE] Fed. Rep. of Germany ....... 2545267

[51] Int. Cl.² .............................................. C08K 5/05
[52] U.S. Cl. .............................. 260/33.4 R; 260/34.2; 260/37 N
[58] Field of Search ................. 260/37 N, 78 L, 78 S, 260/33.4 R

[56] References Cited

U.S. PATENT DOCUMENTS 3,255,148  6/1966  Sievenpiper et al. ............. 260/37 N
3,910,861  10/1975  Wolvers et al. .................. 260/37 N

OTHER PUBLICATIONS

"Eveil de Berney"; French Newspaper; 22 Jan. 1970, p. 3.

Primary Examiner—Lewis T. Jacobs
Attorney, Agent, or Firm—Gilbert L. Wells

[57] ABSTRACT

Polylaurolactam powder coating compositions for the coating of metals at high temperatures are obtained by grinding low molecular weight and brittle polylaurolactam with subsequent condensation by heating of the powder to temperatures of below its melting point.

A. For the production of pigment free polylaurolactam powders, the low molecular weight granules are ground at temperatures of between 0° and 45° C. which have a relative viscosity of between 1.25 and 1.45 (measured in a 0.5 percent m-cresol solution at 25° C.) and have been produced by the polymerization of laurolactam in the presence of 2 - 10 percent by weight of water, 0.3 - 0.7 percent by weight of phosphoric acid at temperatures of between 265° and 300° C. in the absence of chain stabilizers under internal pressure, with subsequent granulating, and extraction between 25° and 70° C. with methanol or ethanol. The subsequent condensation is conducted at temperatures of between 140° C. and below the melting point of the polyamide to relative viscosity value of between 1.55 and 1.65; and finally the powders obtained are brought to a particle size distribution of between greater than 60 and less than 350 microns.

B. For the production of pigmented polylaurolactam powders, the low molecular weight granules are treated at temperatures of between 110° and 140° C. and pressures of between 5 and 8 bars with the addition of pigments in primary aliphatic alcohols having 1 - 3 carbon atoms, cyclohexanol, or ethylbutanol, these granules having a relative viscosity of between 1.25 and 1.65 and likewise having been obtained by the polymerization of laurolactam in the presence of 2 - 10 percent by weight of water, 0.3 - 0.7 percent by weight of phosphoric acid at temperatures of between 265° and 300° C. in the absence of chain stabilizers under internal pressure, with subsequent granulating, and extraction between 25° and 70° C. with methanol or ethanol. The powders are obtained with gradual cooling to room temperature with a minimum of mechanical motion and these powders are dried, optionally screened and, if necessary, the thus-extracted granules or the dried powders are brought to relative viscosity value of between 1.55 and 1.65 by subsequent condensation at temperatures of between 140° C. and below the melting point of the polyamide.

10 Claims, No Drawings

4,143,025

METHOD FOR PRODUCING POLYLAUROLACTAM POWDER COMPOSITIONS FOR THE COATING OF METALS AT HIGH TEMPERATURES

CROSS REFERENCES TO RELATED APPLICATIONS

The disclosure of copending application Ser. No. 283,966, filed Aug. 28, 1972 is incorporated herein.

Application Ser. No. 283,966 discloses a polylauryllactam and the state of the art of producing polyamide powders both by pulverization and precipitation from solution.

BACKGROUND OF THE INVENTION

The field of the present invention is polyamide powders for the coating of metals.

The invention is particularly concerned with methods for the production of polylaurolactam compositions for the coating of metals at high temperatures obtained by grinding low molecular weight brittle polylaurolactam with subsequent heating of the powder to temperatures of below its melting point.

The state of the prior art of producing polyamide powders may be ascertained by reference to U.S. Pat. Nos. 2,698,966; 2,742,440; 2,975,128; 3,203,822; 3,299,009; 3,476,711; 3,927,141; and 3,966,838; British Pat. Nos. 535,138 and 830,757; West German Published applications Nos. 1,570,392; 1,669,821; 1,210,183; 1,267,428; 1,520,551 and 1,495,147; East German Pat. Nos. 7283; 23,607; 24,307 and 25,173; French Pat. Nos. 951,924 and 1,384,988, and Swiss Pat. No. 582,517; and the Kirk-Othmer "Encyclopedia of Chemical Technology" 2nd Ed., Vol. 16 (1968), under the section "Polyamide (Plastics)", pages 88–105, particularly page 92 - polylauryllactam (nylon-12), and polyundecanamide (nylon-11), page 101 Solution Processes, and Powder Processing, pages 101–102, the disclosures of which are incorporated herein.

U.S. Pat. No. 2,698,966 discloses physical mixtures of different types of nylon powders produced by dissolving the nylon in organic solvents and precipitating the powdered particles. In Example 14 of U.S. Pat. No. 2,742,440, the solution of epsilon caprolactam in alcohol-water solution and its precipitation as a powder is disclosed. The dispersion of Teflon powder in a solution of epsilon caprolactam and the coprecipitation of the powders is disclosed in U.S. Pat. No. 2,975,128.

The flame spraying and fluidized bed coating of nylon on a metal base is disclosed in U.S. Pat. No. 3,203,822. U.S. Pat. No. 3,299,009 discloses the n-methoxymethylation of nylons, and U.S. Pat. No. 3,410,832 discloses the preparation of polymers and copolymers of lauryllactam.

It is known to use polyamide powder coating compositions for the preparation of varnish-type coatings on metals. The coating operation is conducted in accordance with the fluidized bed coating method, the flame spraying method, or the electrostatic coating method. The polyamide powders are obtained by precipitating the polyamide from solutions (text of German Patent application No. S 2805 39b 22/04, laid open on May 10, 1951), or by grinding the polyamide granules, preferably at low temperatures under an inert gas atmosphere.

It is furthermore known to produce polyamide powders by grinding low molecular polyamides and then bringing the thus-obtained powders to the desired relative viscosity or molecular weight by heating them conventionally to temperatures of below the melting point as disclosed in British Pat. No. 535,138; West German Published application No. 1,570,392 and U.S. Pat. No. 3,476,711.

Polylaurolactam powders are also prepared in accordance with these conventional methods and are used for coating purposes according to known methods as disclosed in Chem. Ind., November 1968: 783–791, and Modern Plastics, February 1966: 153–156. Since polylaurolactam powders do not always meet the required conditions of high elasticity, satisfactory edge coating, smooth surface, resistance to alkaline aqueous solutions, and in many cases tend especially to smoke during processing, a large number of improvements have become known, such as plasticizer containing polylaurolactam powders, as disclosed in West German Published application No. 1,669,821, those of a mixture of homopolylaurolactam and laurolactam-containing copolyamides, as disclosed in U.S. Patent application No. 283,966, those containing polyamides with N-alkoxymethyl groups in addition to acid reacting catalysts, as disclosed in U.S. Pat. No. 3,966,838, or mixtures of polyamides having 8–11 aliphatically bound carbon atoms per carbonamide group, aminoplasts carrying alkoxyalkyl groups, and acid reacting catalysts, as disclosed in U.S. Pat. No. 3,927,141. These powders exhibit good properties in individual cases, but do not as yet fully satisfy all of the required conditions.

SUMMARY OF THE INVENTION

Having in mind the limitations of the prior art, it has now been discovered that improved coating compositions of polylaurolactam, which can be applied in the form of a powder, are obtained, yielding coatings at above their film-forming temperature without the production of interfering smoke with a smooth surface, a satisfactory edge covering, good elasticity, and excellent resistance against alkaline aqueous solutions, by executing the following steps:

A. For the production of pigment free polylaurolactam powders, granules are ground at temperatures of between 0° and 45° C. which have a relative viscosity of between 1.25 and 1.45 and have been produced by the polymerization of laurolactam in the presence of 2–10 percent by weight of water, 0.3–0.7 percent by weight of phosphoric acid at temperatures of between 265° and 300° C. in the absence of any chain stabilizers under internal pressure, with subsequent granulating, and extraction between 25° and 70° C. with methanol or ethanol. A subsequent condensation is then conducted at temperatures of between 140° C., and below the melting point of the polyamide to relative viscosity of between 1.55 and 1.65; and finally the powders obtained are sized and brought to a particle size distribution of between greater than 60 and less than 350 microns.

B. For the production of pigmented polylaurolactam powders, granules are treated at temperatures of between 110° and 140° C. and pressures of between 5 and 8 bars with the addition of the pigments in primary aliphatic alcohols having 1–3 carbon atoms, cyclohexanol, or ethylbutanol, these granules having a relative viscosity of between 1.25 and 1.45 or 1.25 and 1.65 and likewise having been obtained by the polymerization of laurolactam in the presence of 2–10 percent by weight of water, 0.3–0,7 percent by weight of phosphoric acid at temperatures of between 265° and 300° C. in the absence of any chain stabilizers under internal pressure, with subsequent granulating, and extraction between 25° and 70° C. with methanol or ethanol. The powders are obtained by precipitation with gradual cooling to room temperature with a minimum of mechanical motion. These powders are dried, optionally screened and, if necessary, the thus extracted granules or the dried powders having a relative viscosity between 1.25 and 1.45 are brought to a relative viscosity of between 1.55 and 1.65 by subsequent condensation at temperatures of between 140° C. and below the melting point of the polyamide.

The relative viscosities of the present invention, which are an indication of the molecular weight of the polylaurolactams of the present invention, are measured in a 0.5 percent meta-cresol solution at 25° C. according to German Industrial Standard (DIN) 53,727.

DESCRIPTION OF THE PREFERRED EMBODIMENTS

The general methods of preparing polyamides in the presence of phosphoric acids, useful in the present invention, are known where U.S. Pat. No. 2,557,808 discloses using concentrations between 0.01 and 10 percent by weight; French Pat. No. 951,924 discloses, in the case of laurolactam, less than 3 mol percent and approximately 1.5 percent by weight; East German Pat. No. 7,283 discloses 0.1 to 1 percent; Swiss Pat. No. 582,517 discloses 0.2 to 4 percent by weight; and West German Published application No. 1,210,183 discloses $10^{-3}$ to $10^{-6}$ moles of phosphorus per mole of lactam which corresponds to approximately $0.4 \times 10^{-4}$ to 0.04 percent by weight.

Laurolactam is polymerized in the presence of phosphoric acid, using temperatures of between 300° and 330° C. and quantities of phosphoric acid of between preferably 0.1 and 0.3 percent by weight as disclosed in West German Published applications Nos. 1,267,428 and 1,495,147, and Dutch Published application No. 70/10033, the customary viscosity stabilizers, such as mono- or dicarboxylic acids in particular, are furthermore employed. It is known from East German Pat. Nos. 23,607, 24,307, and 25,173 to use, when operating with phosphoric acid, minor amounts of water as well as minor amounts of phosphoric acid. From this multitude of prior art, relating generally to the polymerizing art, no teaching can be derived with respect to optimizing the polymerization to obtain usable polylaurolactam powders satisfying all of the requirements, the more so since, as has been discovered, the polymerization condition is merely one of the prerequisites to be maintained in addition to the aforementioned, further conditions.

It is likewise known to extract prepolymers and then further to condense same as disclosed in British Pat. No. 830,757, and U.S. Pat. No. 3,476,711. This intermediate extraction is conducted in the production of polylaurolactam powders to be employed for the aforementioned coating purposes within a narrow temperature range and only with strictly selected extractants. It has furthermore been found that the powders must be prepared according to differing methods. Natural colored powders, which can contain stabilizers but must not contain any pigments, are produced according to the grinding method, wherein again strictly selected temperature limits are maintained. The subsequent condensation takes place according to conventional methods at temperatures of above 140° C. and below the melting point of the polylaurolactam (179° C.), but however, the relative viscosity values must lie in a narrow range. The particle size distribution of the present invention powder ranges between greater than 60 and less than 350 microns, i.e. smaller or larger powder particles should not be present if at all possible. The distribution is such that 83 ± 5 percent is of a particle size of between 63 and 200 microns.

Pigment containing powders, however, are prepared according to the precipitation method. In this mode of operation, the starting granules can already exhibit the desired relative viscosity −(1.25 to 1.65), but it is advantageous from a manufacturing viewpoint to use the low viscosity granules (1.25 to 1.45), since this is more economical for the production technique. The subsequent condensation is then effected after the extraction of the granules or also on the precipitated, dried powders. Selected solvents are used in the precipitation process, and a narrow temperature range is maintained. The pigments are added during this precipitation stage. Accordingly, the mode of operation is described by the following procedures.

POLYMERIZING STAGE

Laurolactam is heated under an inert gas atmosphere to 265°–300° C. in the presence of 2–10 percent by weight of water and 0.3–0.7, especially 0.4–0.5 percent by weight of phosphoric acid. The operation is carried out under the thus-attained internal pressure ranging generally between 14 and 25, preferably between 16 and 20 bars. The relative viscosity values range between 1.25 and 1.45, preferably between 1.33 and 1.43, particularly preferably between 1.35 and 1.40. The polymerization takes in general 3–8 hours. The polymer obtained is transferred at a temperature of 200°–260° C. and under a pressure of 9–15 bars, i.e. at a steam pressure of this magnitude, from the autoclave suitably into a water bath. The skein of polymer is comminuted, and the granules produced are extracted at 25°–70° C. with methanol or ethanol, which is carried out simply by 2–3 times extraction by boiling with 2–3 times the amount by weight of the extractant. The dried granules are thereafter processed into powders.

(A) WITH THE USE OF A GRINDING PROCEDURE

The polylaurolactam must have a relative viscosity of between 1.25 and 1.45, preferably 1.33–1.43, especially preferably between 1.35 and 1.40. The grinding step is executed in a mill as disclosed in U.S. Pat. No. 3,476,711 at a temperature of between 0° and 45°, preferably between 10° and 35°, particularly preferably between 15° and 25° C. Only in this temperature range is it possible to obtain round grains without caking which additionally do not have an excessive amount of fines. When the grinding step is carried out at temperatures of below 0° C., a high quantity of fines of below 60 microns is produced, so that the powders are useless even after this proportion of fines has been separated. Besides, the fracture edges of the grain are sharper, and the capability of being fluidized becomes lower. When the temperature rises to values of above 45° C. during the grinding step, the grains exhibit superficially molten parts in the shape of spikes. The powders are subjected to a subsequent condensation in the solid phase at 145°–165°, preferably 150°–160° C., to attain relative viscosity values of between 1.50 and 1.65, preferably between 1.55 and 1.63. The desired sizing or removal of the fines proportion less than 60 micron and of the coarse proportion greater than 350 microns takes place by sieve screening or air sifting.

(B) WITH THE USE OF A PRECIPITATION PROCEDURE

When pigmented polylaurolactam powders, or powders with additives which cannot be introduced during the polycondensation are to be prepared, then the powders are produced by a precipitation process. For this purpose, the polylaurolactam samples prepared as set out above and having relative viscosities of between 1.25 and 1.65, preferably between 1.33 and 1.65, especially preferably between 1.40 and 1.60, are used. Suitable as precipitating agents are methanol, ethanol, propanol, 2-ethylbutanol, and cyclohexanol. Ethanol is preferred, making it possible to precipitate therein at about 135° C., and about 7 bars, 50–60 percent of polylaurolactam. The additives, such as, for example, $TiO_2$ are added during the precipitating step and are thus incorporated into the powder. The type of precipitation is decisive for the granular distribution of the powder obtained. With too vigorous an agitation and too rapid a cooling step, the results are powders having a fines proportion of 40–90 percent of less than 40 microns, unsuitable as a powder for fluidized bed treatment. In contrast thereto, when the cooling step is executed at about 1° C. per minute without agitation or very slow agitation, only an extremely minor fines proportion of below 40 microns is obtained. The powders are dried under an oil pump vacuum at 40°–100° C. and sized by screens or sifting as set forth above.

Suitable pigments used in modification (b) (precipitation procedure) are titanium dioxide, carbon black, barium sulfate, iron oxide. They are generally added in amounts of about 1–20 percent by weight, preferably 2–10 percent by weight, based on the polyamide. Pigments along these lines are also understood to include dyes, such as phthalocyanines and azo dyes. Antiaging substances and heat and light stabilizers, customarily present in an amount of 0.1–2 percent by weight, such as sterically hindered phenols or triazines, can be added in case of modification (a) before, during, or after the polymerization and also, for example, during the grinding process or also during the subsequent condensation step. The powders are useful especially in accordance with the fluidized bed process, but can also be employed with the aid of flame-spraying or electrostatic coating methods. The layer thickness of the coating composition is in the case of the fluidized bed treatment between 200 and 500 microns, and in the case of the flame-spraying procedure between 200 and 800 microns.

It is possible to use adhesion promoters.

The present invention is described in greater detail below with the use of specific examples. The relative viscosities were measured in meta-cresol at a concentration of 0.5 g/100 ml. at 25° C. as disclosed in German Industrial Standard 53,727.

EXAMPLE 1

In an autoclave, 10 kg of laurolactam is heated for 7 hours to 280° C. together with 800 g. of water and 60 g. of 85 percent strength phosphoric acid (corresponding to 0.51 percent phosphoric acid), the pressure thus attained is approximately 19 bars. Thereafter, the mixture is cooled to 240°–230° C. (the pressure being about 13–14 bars) and the bottom valve is opened. The polymer is conducted into a water bath by a water jet impinging on the skein of polymer having an angle of about 90° and, after cooling, is comminuted or ground in an impeller mill. The polylaurolactam is dried under a pressure of about 30 mbar and at a temperature of 60°–80° C. The relative viscosity is 1.39. The extract, determined by two hours of boiling of a sample with twice the amount of methanol and concentration of the extract to dryness, amounts to 1.5 percent by weight.

The polymer particles are refluxed for 2 hours with twice the amount by weight of methanol. The methanol is discharged and replaced by the same amount of fresh methanol. The mixture is once more refluxed for two hours, the methanol is discharged, and the mixture is dried at 30 mbar and 80° C. The polylaurolactam is ground in an impact pulverizer at a cycle gas temperature of 20° C. The pulverizer is maintained at a temperature of 20° C. by introducing liquid nitrogen in increments. The powder has a fines proportion of less than 5 percent of below 60 microns. Thereafter, the powder is subjected to a subsequent condensation in a drying chamber in a thin layer by passing nitrogen thereover at a temperature of 145° C. for a period of 5 hours. The powder then has a relative viscosity of 1.59.

The coating of metallic components in accordance with the fluidized bed coating step with the use of the polylaurolactam powder yields the following evaluation: no smoking during the coating step, good fluidizability, smooth coating surface, good to very good covering of sharp edges, Erichsen depression greater than 10 mm, impact depression greater than 1800 mm/7.6 kg., resistance with respect to 1 percent boiling alkaline solution of a coarse detergent greater than 2000 hours.

EXAMPLE 2

The polylaurolactam ground and extracted in accordance with Example 1 is subjected to a subsequent condensation in a forced circulation evaporator by passing nitrogen over the material for 4 hours at 150° C. The polymer then has a relative viscosity of 1.60.

A glass autoclave is charged with 100 g. of the polylaurolactam, 200 ml. of ethanol, and 7 g. of $TiO_2$ pigment. The mixture is heated for 2 hours to 140° C., thus attaining a pressure of about 7 bars. Thereafter, a cooling step at 1° C. per minute is conducted at an agitating speed of about 5 r.p.m. The precipitated powder is dried in a drying chamber at 0.7 mbar and 80° C. In the coating of metallic components, the white-dyed powder receives in all items the same satisfactory evaluation as in case of the natural colored powder of Example 1.

EXAMPLE 3

The polylaurolactam ground and extracted in accordance with Example 1 is subjected to a subsequent condensation in a forced circulation evaporator by passing nitrogen over the material for 4 hours at 150° C. The polymer then has a relative viscosity of 1.60. 100 g. of the polylaurolactam is refluxed for 2 hours together with 7 g. of $TiO_2$ pigment and 300 ml. of 2-ethylbutanol and then cooled under slow agitation. The powder is dried at 0.7 mbar and 80° C. The fines proportion of less than 60 microns is screened. The thus produced powder possesses the same coating properties as the powders described above.

COMPARATIVE EXAMPLE 1

400 g. of granulated polylaurolactam, obtained by the hydrolytic polymerization of laurolactam in the presence of 3 percent by weight of water and 0.2 percent by weight of adipic acid, wherein in the first stage a polycondensation is conducted at an internal pressure of between 16 and 20 bars at 280° C., and after removal of the water and after expansion, a subsequent condensation step is executed at 260° C., in accordance with West German Published Application 2,152,194, relative viscosity = 1.60, is heated to the boiling point for 5 hours with 30 g. of $TiO_2$ pigment in 900 ml. of dimethylformamide. After cooling, the powder is dried at 0.7 mbar and 80° C., and the fines proportion of less than 60 microns is removed by screening.

The powder shows the following grading in the coating process:

Good capability for fluidizing, strong smoking during the coating operation, insufficient covering of sharp edges, Erichsen depression 6–8 mm., impact depression less than 100 mm/7.6 kg., resistance to 1 percent boiling alkaline solution of a coarse detergent less than 200 hours.

COMPARATIVE EXAMPLE 2

In accordance with the process described in Example 1, a polylaurolactam is produced without the addition of phosphoric acid (relative viscosity = 1.42) and, as described in Example 1, extracted, ground, and subsequently condensed in the solid phase to relative viscosity value of 1.60. The fines proportion of less than 60 microns is removed by screening.

The powder shows the following coating characteristics: no smoking during the coating step, no coating on sharp edges, Erichsen depression 6–8 mm., impact depression less than 100 mm/7.6 kg., resistance to a boiling washing solution of a coarse detergent less than 250 hours.

COMPARATIVE EXAMPLE 3

300 g. of the polylaurolactam described in Example 2 and used for the precipitation step, having a relative viscosity of 1.60, is heated to boiling for 5 hours together with 21 g. of $TiO_2$ in 800 ml. of dimethylformamide. After cooling, the powder is dried at 0.7 mbar and 80° C. The fines proportion of less than 60 microns is removed by screening.

Coating properties: no smoking during the coating step, no covering of the coating on sharp edges, Erichsen depression 5 mm., impact depression less than 100 mm/7.6 kg., resistance to a boiling alkaline solution of a coarse detergent less than 200 hours.

COMPARATIVE EXAMPLE 4

Comparative Example 3 is repeated with the difference that 2-ethylhexanol is used in place of dimethylformamide for precipitation purposes. During the coating step, the same evaluation is obtained as set forth in Comparative Example 3.

COMPARATIVE EXAMPLE 5

In accordance with the method described in Example 1, a polylaurolactam batch with a phosphoric acid addition of 0.1 percent by weight and another with a phosphoric acid addition of 1 percent by weight are prepared (relative viscosities = 1.43 and 1.40, respectively) and extracted, ground, and subsequently condensed to a relative viscosity of 1.61 and 1.59, respectively, in the solid phase, as in Example 1. The powders show the following coating properties:

| (a) 0.1% $H_3PO_4$ | (b) 1% $H_3PO_4$ |
|---|---|
| no smoking | slight smoking |
| satisfactory coating on sharp edges | no coat on sharp edges |
| Erichsen depression <10 mm. | Erichsen depression <8 mm. |
| impact depression <100 mm/7.6 kg. | impact depression <200 mm/7.6 kg. |
| resistance with respect to boiling 1% alkaline solution <500 hours | resistance with respect to boiling 1% alkaline solution <300 hours |

COMPARATIVE EXAMPLE 6

Polylaurolactam powders are produced in accordance with Example 1, except that the grinding temperature is 50° C. in the first test and −10° C. in the second test. The powders are subsequently condensed to a relative viscosity of 1.59 in analogy to Example 1.

(A) TEST 1

The fluidizing capability of the powder is so poor that no useful coating can be produced by following the fluidized bed process. Observation under a microscope reveals that the grains have spike-shaped cakings.

(B) TEST 2

The fines proportion of the powder of less than 60 microns is so large that a removal by screening becomes technically unreasonable. The powder itself is fluidized only with great difficulties and is unsuitable for fluidized bed coating.

The following Table comprises the results of the tests from the examples and comparative examples. It can be seen that only if all necessary measures, as described, are being combined, it is possible to obtain polylauorlactam powders having good properties in all testing methods.

TABLE

| | Smoking | Edge Coat | Erichsen Depression mm. | Impact Depression mm./7.6 kg. | Alkali Test Hours |
|---|---|---|---|---|---|
| Example 1 | No | Very Good | >10 | >1800 | >2000 |
| Example 2 | No | Very Good | >10 | >1800 | >2000 |
| Comparative Example 1 | Strong | Insufficient | 6–8 | <100 | <200 |
| Comparative Example 2 | No | Practically Uncoated | 6–8 | <100 | <250 |
| Comparative Example 3 | No | Practically Uncoated | 5 | <100 | <200 |
| Comparative Example 4 | No | Practically Uncoated | 5 | <100 | <200 |
| Comparative Example 5 (a) | No | Good | >10 | <100 | <500 |
| 5 (b) | Minor | Practically Uncoated | <8 | <200 | <300 |
| Comparative Example 6 (a) | Unusable | | | | |
| 6 (b) | Unusable | | | | |

We claim:

1. A method of producing pigmented polylaurolactam powders comprising:
 (a) polymerizing laurolactam in the presence of about 2 to 10 percent by weight of water, about 0.3 to 0.7 percent by weight of phosphoric acid, and at a temperature of about 265° to 300° C., in the absence of chain stabilizers under an internal pressure of about 14 to 25 bars to a polylaurolactam having a relative viscosity of about 1.25 to 1.65;
(b) granulating said polylaurolactam of (a);
(c) extracting said granulated polylaurolactam with ethanol or methanol at a temperature of about 25° to 70° C.;
(d) mixing said extracted polylaurolactam with about 1 to 20 percent by weight pigment dispersed in a liquid selected from the group consisting of primary aliphatic alcohols having 1–3 carbon atoms, cyclohexanol and ethylbutanol and treating the mixture at a temperature of about 110° to 140° C. and pressures of about 5 to 8 bars; and
(e) cooling the treated mixture of (d) to room temperature with precipitation of said pigmented polylaurolactam powders.

2. The method of claim 1, wherein said pigmented polylaurolactam powders are sized to a particle distribution of between greater than about 60 and less than about 350 microns.

3. The method of claim 1, wherein cooling step (e) is carried out at the rate of 1° C. per minute.

4. The method of claim 1, wherein said relative viscosity is 1.33 to 1.65.

5. The method of claim 1, wherein said relative viscosity is 1.40 to 1.60.

6. The method of claim 1, wherein said pigment is selected from the group consisting of titanium dioxide, carbon black, barium sulfate and iron oxide.

7. A method of producing pigmented polylaurolactam powders comprising:
(a) polymerizing laurolactam in the presence of about 2 to 10 percent by weight of water, about 0.3 to 0.7 percent by weight of phosphoric acid and at a temperature of about 265° to 300° C. in the absence of chain stabilizers under an internal pressure of about 14 to 25 bars to a polylaurolactam having a relative viscosity of about 1.25 to 1.45;
(b) granulating said polylaurolactam of (a);
(c) extracting said granulated polylaurolactam with ethanol or methanol at a temperature of about 25° to 70° C.;
(d) mixing said extracted polylaurolactam with about 1 to 20 percent by weight pigment dispersed in a liquid selected from the group consisting of primary aliphatic alcohols having 1–3 carbon atoms, cyclohexanol and ethylbutanol and treating the mixture at a temperature of about 110° to 140° C. and pressures of about 5 to 8 bars;
(e) cooling the treated mixture of (d) to room temperature with precipitation of pigmented polylaurolactam powder; and
(f) condensing the precipitated powder of (e) at a temperature between about 140° C. and below the melting point of said polylaurolactam to said pigmented polylaurolactam powders having a relative viscosity of about 1.55 to 1.65.

8. The method of claim 7, wherein said pigmented polylaurolactam powders are sized to a particle distribution of between greater than about 60 and less than about 350 microns.

9. The method of claim 7, wherein cooling step (e) is carried out at the rate of 1° C. per minute.

10. The method of claim 7, wherein said pigment is selected from the group consisting of titanium dioxide, carbon black, barium sulfate and iron oxide.

* * * * *